United States Patent
Chen et al.

(10) Patent No.: US 7,336,573 B2
(45) Date of Patent: Feb. 26, 2008

(54) METHOD FOR HANDLING INTERRUPT REQUEST IN OPTICAL STORAGE DRIVE

(75) Inventors: Ping-Sheng Chen, Chia-Yi Hsien (TW); Bo-Ching Lu, Tai-Chung (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 434 days.

(21) Appl. No.: 10/711,996

(22) Filed: Oct. 19, 2004

(65) Prior Publication Data
US 2005/0094524 A1    May 5, 2005

(30) Foreign Application Priority Data
Oct. 29, 2003    (TW) .................... 92130129 A

(51) Int. Cl.
*G11B 7/00*    (2006.01)
(52) U.S. Cl. ................... 369/47.32; 369/53.31
(58) Field of Classification Search ........ None
See application file for complete search history.

(56) References Cited

U.S. PATENT DOCUMENTS

| | | | | |
|---|---|---|---|---|
| 4,855,842 A | * | 8/1989 | Hayes et al. ............... 386/125 |
| 5,721,717 A | * | 2/1998 | Obata et al. ............... 369/44.27 |
| 6,026,068 A | * | 2/2000 | Obata et al. ............... 369/53.2 |
| 6,147,943 A | * | 11/2000 | Ogasawara et al. ....... 369/44.32 |
| 6,282,673 B1 | * | 8/2001 | Liu et al. ...................... 714/25 |
| 6,331,966 B1 | * | 12/2001 | Minami et al. ............ 369/13.07 |
| 7,164,636 B2 | * | 1/2007 | Ijtsma et al. .............. 369/47.53 |
| 2003/0046599 A1 | * | 3/2003 | Takamiya et al. ........... 713/600 |
| 2004/0057366 A1 | * | 3/2004 | Sasaki ..................... 369/53.37 |
| 2007/0147150 A1 | * | 6/2007 | Shibuya et al. ............. 365/201 |

* cited by examiner

*Primary Examiner*—Wayne Young
*Assistant Examiner*—Van T. Pham
(74) *Attorney, Agent, or Firm*—Winston Hsu

(57) ABSTRACT

When an optical storage drive executes a control procedure or operation, a method of handling an interrupt request includes utilizing the optical storage drive to receive an interrupt request from a control circuit; checking whether the interrupt request is a read command; if the interrupt request is a read command, checking whether data indicated by the read command is in a buffer; and if the indicated data in the buffer, transferring the corresponding data to the control circuit from the buffer to respond to the interrupt request.

14 Claims, 4 Drawing Sheets

METHOD FOR HANDLING INTERRUPT REQUEST IN OPTICAL STORAGE DRIVE

BACKGROUND

The invention relates to optical storage drives, and more particularly, to a method for handling an interrupt request in an optical storage drive that executes a control procedure or an operation that needs a long time.

As computer devices become more popular, the application of computer devices is expanding. In addition to normal business use, personal computers are being used at home for providing functions such as multimedia entertainment. Because multimedia entertainment involves enormous audio and video streams for generating the needed visual and voice effects, the development of data-storage technology has been further promoted. One by one, many different kinds of data-storage devices have appeared for storing the digital data more easily. Among theses data-storage devices, optical discs have been the preferred tool for users to record data in recent years because of the low cost, small volume, and large capacity of optical discs. In addition to the data for normal documents and programs, optical discs are also widely used for storing multimedia data such as audio streams and video streams. An optical storage drive is used for accessing the data stored on the optical discs.

Please refer to FIG.1, which is a diagram of an optical storage drive 120 operating in coordination with a host 110 according to the related art. The optical storage drive 120 couples with the host 110 and receives the control commands from the host 110 to operate. The optical storage drive 120 comprises a control circuit 122 that is used for controlling the operation of the optical storage drive 120. Additionally, a non-volatile storage memory 124 (such as Flash memory), a buffer 126 (such as the volatile RAM or the registers), and a servo module 140 used for achieving the function of the optical storage drive 120 are set up in the optical storage drive 120. The buffer 126 is used for temporarily storing the data that is needed during the operation of the optical storage drive 120. The servo module 140 comprises a spindle motor 142, a pickup head 146, and other mechanical and electrical devices. The spindle motor 142 is used for driving the optical disc 150 to rotate. The pickup head 146 slides along a sliding track 144 to access data of different tracks in the optical disc 150.

Generally speaking, the host 110 sends the high-level control commands to the control circuit 122 of the optical storage drive 120. The control circuit 122 executes the firmware program code 130 stored in the non-violate storage memory 124 according to the control command. The control circuit 122 executes the corresponding control procedure stored in the firmware program code 130 for controlling the servo module 140 to execute the main function of the optical storage drive 120.

For example, the host 110 sends a read command to the optical storage drive 120 and assigns the address of the data in the optical disc 150 when reading the data in the optical disc 150. And then the control circuit 122 executes the firmware program code 130 of the optical storage drive 120 for coordinating the operations of the spindle motor 142, the pickup head 146, and other devices, such as controlling the spindle motor 142 to reach a specific rotational speed and moving the pickup head 146 to a pre-determined track for receiving reflected laser light from the optical disc 150. The data that the servo module 140 reads from the optical disc 150 is temporarily stored in the buffer 126 and is then transferred to the host 110 using the control circuit 122.

Please refer to FIG. 2, which is a flowchart 200 of the optical storage drive 120 reading data from the optical disc 150 according to a read command of the host 110 according to the related art. The flowchart 200 comprises the following stops:

Step 202: The optical storage drive 120 utilizes the control circuit 122 to receive and interpret a read command Instruction_A from the host 110.

Step 204: The optical storage drive 120 executes a read procedure according to the read command Instruction_A.

Step 206: The control circuit 122 is utilized to check whether data indicated by the read command Instruction_A is stored in the buffer. If the indicated data is stored in the buffer, go to step 212, if not, go to step 208.

Step 208: The control circuit 122 is utilized to execute the firmware program code 130 for controlling the servo module 140 to execute seeking operation.

Step 210: The servo module 140 is utilized to read the data indicated by the read command Instruction_A in the optical disc 150 and to temporarily store the data in the buffer 126.

Step 212: The control circuit 122 is utilized to send the corresponding data in the buffer 126 back to the host 110 for responding the read command.

Step 214: The read operation is finished.

The detailed operation of the optical storage drive 120 mentioned above reading the data of the optical disc 150 according to a read command from the host 110 is known by those skilled in the art. For brevity, further details are omitted here.

In general, after the host 110 sends a read command to the optical storage drive 120, the host 110 sends the next read command to the optical storage drive 120 until the optical storage drive 120 returns the data indicated by the read command. When the host 110 needs a great deal of data from the optical disc 150 (ex: video data while playing the optical disc 150), the host 110 continuously sends read commands to the optical storage drive 120 for obtaining the data of the optical disc 150.

In the related art, the optical storage drive 120 often utilizes the buffer 126 to provide a cache function. For example, if the optical disc 150 is a VCD, the data to be read by the host 110 is often continuous video data. After the optical storage drive 120 receives a read command from the host 110, the optical storage drive 120 not only temporarily stores the data indicated by the read command in the buffer 126, but also temporarily stores following data in the buffer 126 so that the optical storage drive 120 is able to perform cache operation when receiving following read commands. This means that when the host 110 sends the read command Instruction_A to the optical storage drive 120 in step 202, the optical storage drive 120 executes step 206 to first examine whether the data indicated by the read command Instruction_A is stored in the buffer 126 or not. If the data to be read is stored in the buffer 126, control moves to step 212 for transferring the data in the buffer 126 to the host 110 to respond the read command Instruction_A. The optical storage drive 120 doesn't need to read the data indicated by the read command Instruction_A from the optical disc 150. Therefore, the speed of the optical storage drive 120 responding to the host 110 is improved.

In the related art, a data quantity threshold is usually set up in the buffer 126 of the optical storage drive 120. After the optical storage drive 120 fills up the buffer 126 to a specific level of the buffer. The data stored in buffer 126 is continuously transferred to the host 110 because of the read commands send by the host 110. As long as the data quantity in the buffer 126 is more than the data quantity threshold, the optical storage drive 120 doesn't need to execute data-renewing. When the data quantity in the buffer becomes equal to or lower than the data quantity threshold, the optical storage drive 120 reads the following data from the optical disc 150 for filling up the data quantity of the buffer 126 to the specific level.

Therefore, in step 206, if the related art judges that the data indicated by the read command Instruction_A is stored in the buffer 126, it also determines whether the data quantity remaining after subtracting the data indicated by the read command Instruction_A is equal to or lower than the data quantity threshold. If the control circuit 122 judges that the remaining data quantity is equal to or lower than the data quantity threshold of the buffer 126 after transferring the data indicated by the read command Instruction_A to the host 110, the control circuit 122 controls the servo module 140 for reading the following data of the optical disc 150 and temporarily storing the data in the buffer to fill up the data quantity to the specific level of the buffer 126 according to the main loops of the firmware program code 130.

Before reading the data of the optical disc 150, the optical storage drive 120 has to execute a seeking operation to move the pickup head 146 to an appropriate position. The seeking operation is a procedure of moving the pickup head 146 along the sliding track 144 to a track that the data to be read belongs to. The executing time of the seeking operation is usually from several microseconds (ms) to 100 microseconds. A long-seeking operation will spend a multiple of the seeking time. The optical storage drive 120 utilizes the cache function provided by the buffer 126 to smooth the procedure of data transferring. Only if the data to be read is not in the buffer 126, or only if parts of the data to be read are in the buffer 126 and the other part of the data to be read have to be read from the optical disc 150, will the optical storage drive 120 have to execute the seeking operation of step 208.

However, in the structure of the firmware program code 130 of the optical storage drive 120 according to the related art, when the optical storage drive 120 executes the seeking operation of step 208 according to the main loop of the firmware program code 130, if the optical storage drive 120 receives a read command Instruction_B send by the host 110, the interrupt request will be generated. After accepting parameters of command, the interrupt request will be temporarily paused. Only when the control circuit 122 has completed the routine procedure (step 208) according to the main loop of the firmware program code 130 will the optical storage drive 120 respond to the interrupt request to interpret and handle the read command Instruction_B. Actually, not only in the seeking operation, but the interrupt request is also paused in all handling methods of the interrupt request when the optical storage drive 120 executes a control procedure or operation that needs a long time in the structure of the firmware program code 130. After the procedure or operation completed, the optical storage drive 120 executes the new interrupt procedure. For example, the operations of normal optical storage drives such as modulating the rotating speed of the spindle motor 142, retrying, and so on, are all control procedures or operations that need a long time.

As known in the related art, the responding speed of the optical storage drive 120 to a read command is much faster than the speed of the optical storage drive 120 executing a seeking operation. For example, the speed of the host 110 transferring data through the IDE or SCSI bus interface is 10 M bytes/second, but the data length requested by each read command send by the host 110 is 20 k bytes. This means that the response time of the optical storage drive 120 to a read command is only 2 milliseconds (ms).

In other words, if the host 110 sends the read command Instruction_B to the optical storage drive 120 during executing the control procedure or operation that needs a longer time in the optical storage drive 120, the read command Instruction_B is responded to after the optical storage drive 120 completes the preceding procedure. So, even if the data indicated by the read command Instruction_B is stored in the buffer 126, the optical storage drive 120 still has to wait until the control procedure or operation is completed and then the optical storage drive 120 responds to the interrupt request. This means the host 110 may cause delays due to the interruption of data. For example, in the related art, when the host 110 utilizes the optical storage drive 120 to read the data of a VCD for playing a video, if the data that the host 100 needs is interrupt, a severe problem such as a delay could occur.

In order to reduce the influence of a delay, the prior applies the State Machine method of the program design to design the firmware program code 130. The State Machine method divides the control procedure or operation that needs a long time of the optical storage drive 120 into many stages for executing. So, the time of each state may be much lower, and the optical storage drive 120 can utilize the interval of states to handle the interrupt request corresponding to the read command send by the host 110 for reducing the time of the read command waiting to be responded.

However, the firmware program code where the State Machine method is utilized is a little complicated so that the difficulties and the cost of updating and maintaining the firmware program code increases. It further influences the timing of products getting into the market.

SUMMARY

It is therefore an objective of the claimed invention to provide a method for parallel handling of a control procedure or operation that need a long time and an interrupt request to solve the above-mentioned problem.

According to the present invention, a method is disclosed for handling an interrupt request in an optical storage drive when the optical storage drive executes a control procedure or operation. The method includes utilizing the optical storage drive to receive an interrupt request from a control circuit; checking whether the interrupt request is a read command; if the interrupt request is a read command, checking whether data indicated by the read command is stored in a buffer; and if the indicated data is stored in the buffer, transferring the corresponding data to the control circuit from the buffer to respond to the interrupt request.

Also disclosed according to the claimed invention, a storage medium for storing program code used to control an optical storage drive to perform the following steps while executing a control procedure or operation: receiving an interrupt request from a control circuit; checking whether the interrupt request is a read command; if the interrupt request is a read command, checking whether data indicated by the read command is stored in a buffer; and if the indicated data is stored in the buffer, transferring the corresponding data to the control circuit from the buffer to respond to the interrupt request.

One advantage of the present invention is that the optical storage drive can handle the read command when an interrupt request occurs. Therefore, the optical storage drive can quickly respond to the read command sent from the host when executing a control procedure or operation that needs a long time. The problem of data delay is thereby improved.

Another advantage of the present invention is that there is no need to utilize the State Machine method to design the firmware program code so that the complexity of the firmware program code is lowered and the convenience of maintaining and updating is increased.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
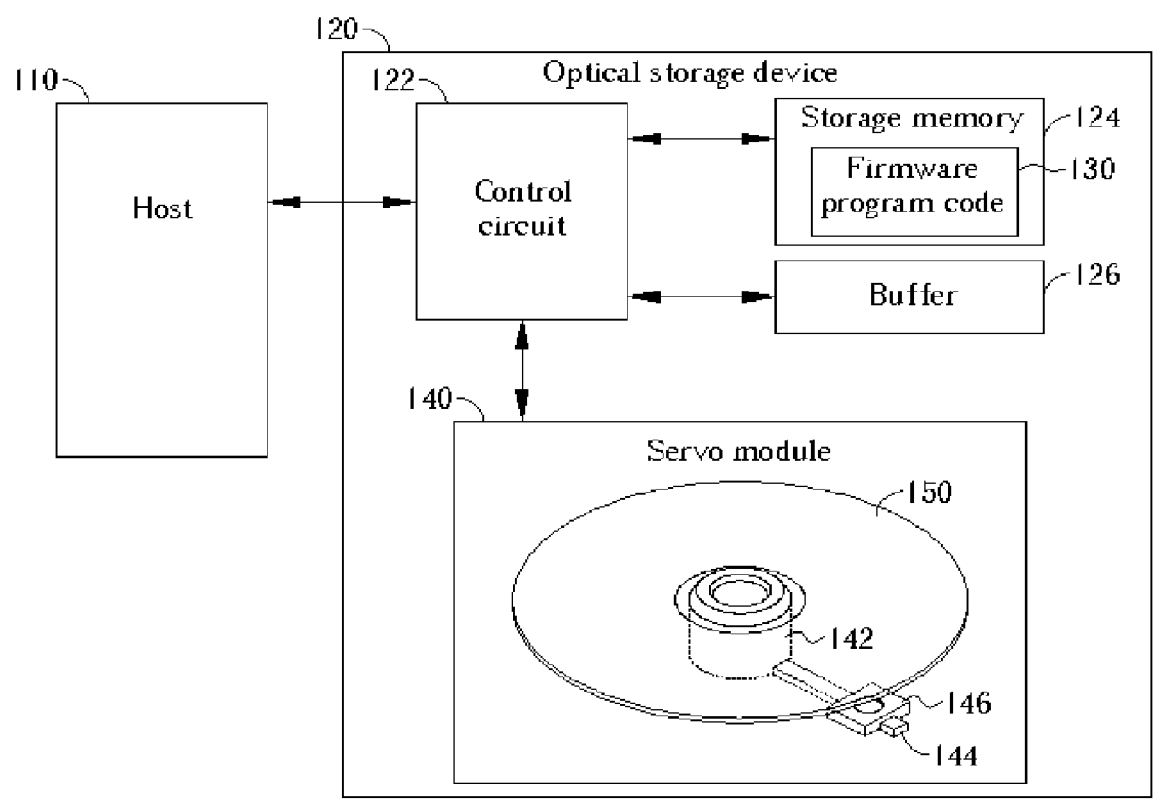
FIG. 1 is a diagram of an optical storage drive operating in coordination with a host according to the related art.
Figure 2:
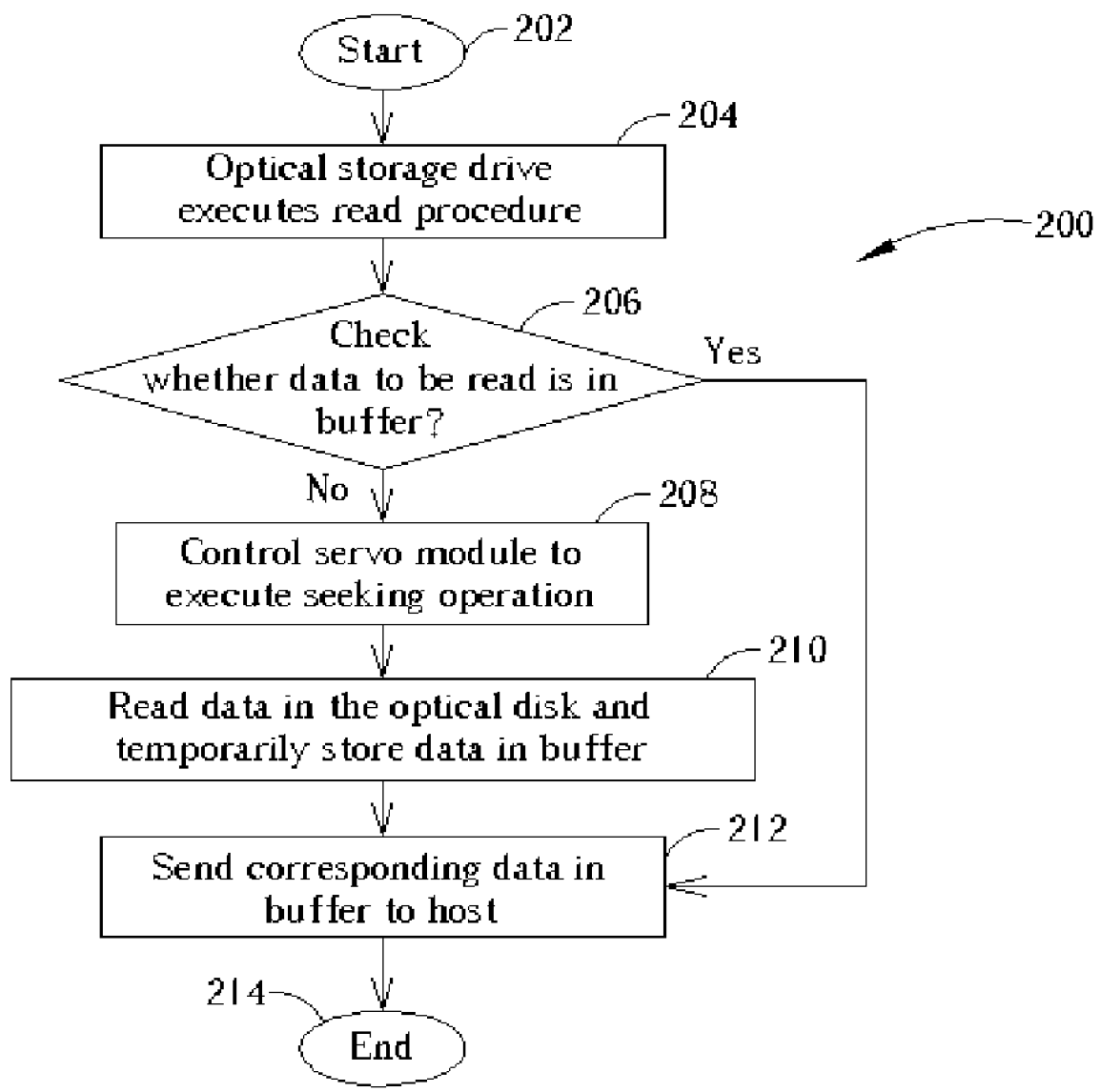
FIG. 2 is a flowchart of an optical storage drive reading data on an optical disc according to a read command of a host according to the related art.
Figure 3:
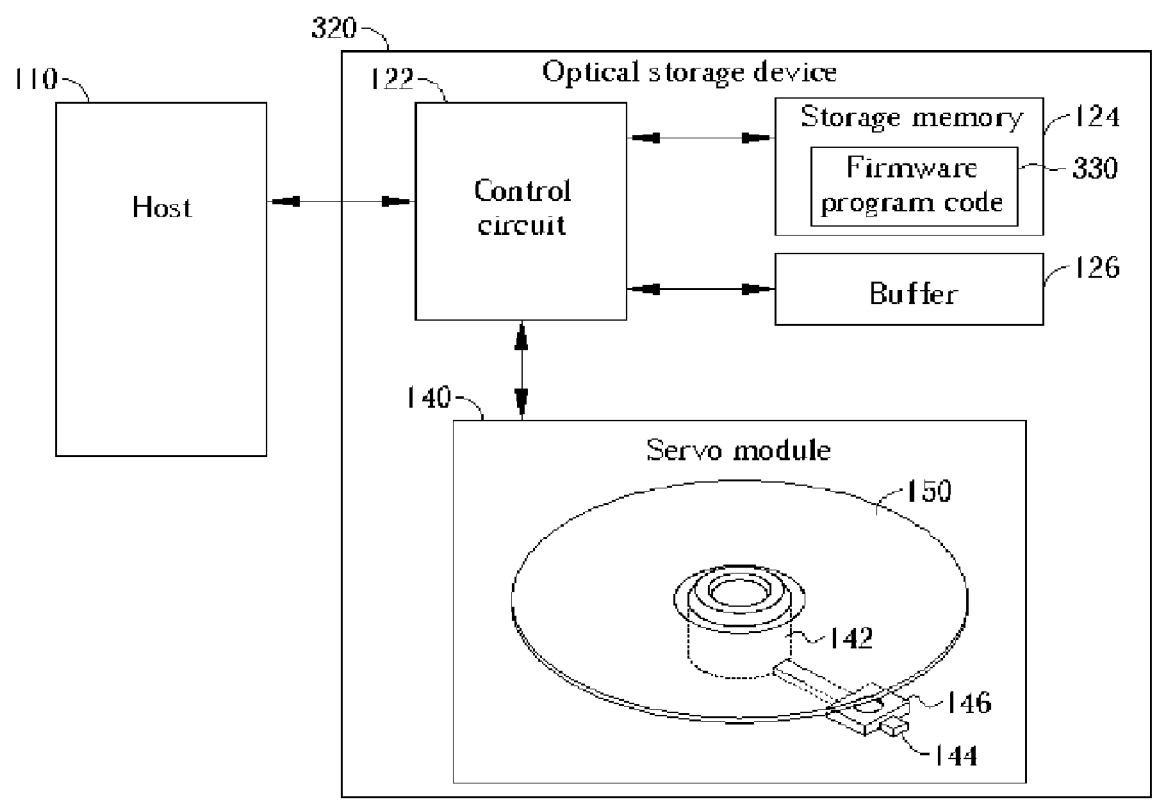
FIG. 3 is a diagram of an optical storage drive operating in coordination with a host according to the present invention.

Please refer to FIG. 3, which is a diagram of an optical storage drive 320 operating in coordination with a host 110 according to the present invention. The optical storage drive 320 and the optical storage drive 120 in FIG. 1 are similar. Therefore, the same device is labeled with the same number. Additionally, the devices of the optical storage drive 320 are connected in the same way as those of the optical storage drive 120. For brevity, repeated details are omitted here.

The difference between the optical storage drive 320 in the present invention and the optical storage drive 120 lies in that the method of the firmware program code 330 of the optical storage drive 320 handling an interrupt request when the optical storage drive 320 executes a control procedure or operation that needs a long time is different from the related art. The operation of the firmware program code 330 is illustrated as follows.

Figure 4:
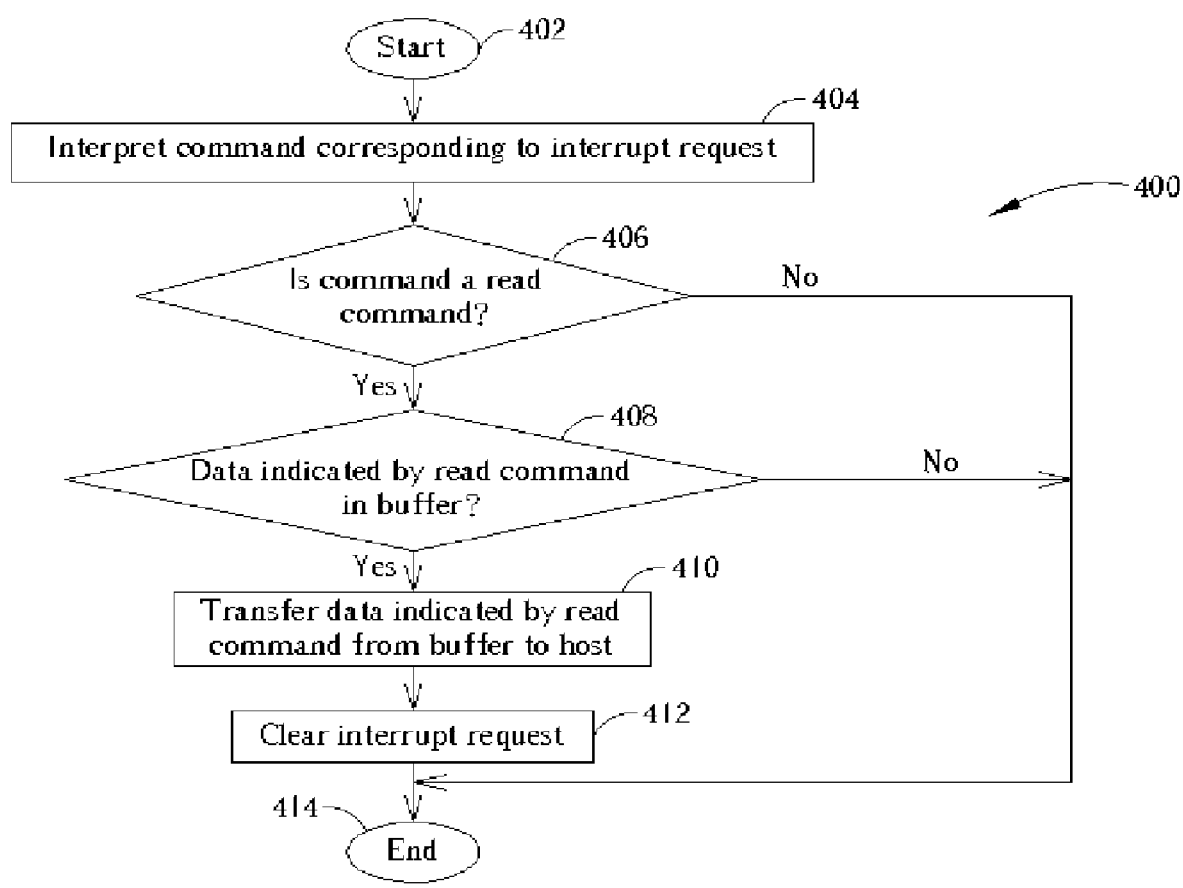
FIG. 4 is a flowchart of an optical storage drive handling an interrupt request when executing a control procedure or an operation that needs a long time.

FIG. 4 is a flowchart 400 of an optical storage drive 320 handling an interrupt request when executing a control procedure or an operation that needs a long time. The flowchart 400 comprises the following steps:

Step 402: The optical storage drive 320 receives a command Instruction_C and generates an interrupt request when executing a control procedure or operation that needs a long time (such as the seeking operation, modulating the spindle motor 142, and so on).

Step 404: The control circuit 122 interprets the command Instruction_C corresponding to the interrupt request.

Step 406: The control circuit 122 is utilized to judge whether the command Instruction_C is a read command. If the command Instruction_C is a read command, go to step 408. If the command Instruction_C is not a read command, go to step 414.

Step 408: The buffer 126 is checked to determine whether it contains the data indicated by the read command. If the data indicated by the read command is in the buffer 126, step 410 is performed. If the data indicated by the read command is not in the buffer 126, step 414 is performed.

Step 410: The control circuit 122 is utilized to transfer the data indicated by the read command in the buffer 126 to the host 110.

Step 412: The control circuit 122 eliminates the interrupt request.

Step 414: The firmware program code 330 returns to the main loop that was originally executed.

Preferably, the optical storage drive 320 utilizes the method for handling an interrupt request of the present invention when executing a control procedure or operation that needs a long time for making the procedure of the optical storage drive 320 transferring the data of the optical disc 150 to the host 110 smoother. In order to further explain the operation of the flowchart 400, as an example, assume that the optical storage drive 320 executes the seeking operation. Please notice that the method for handling an interrupt request of the present invention is not limited to be applied while the optical storage drive executes the seeking operation. In fact, the method for handling an interrupt request of the present invention can be applied while the optical storage drive executes various control procedure or operation.

Continuing the above example, when handling a read command Instruction_A, the optical storage drive 320 checks whether the data indicated by the read command Instruction_A is stored in the buffer 126 and judges whether the data quantity of the buffer 126 will be equal to or lower than a pre-determined data quantity threshold after subtracting the data indicated by the read command Instruction_A. Therefore, the optical storage drive 320 in one aspect utilizes the control circuit 122 to transfer the data corresponding to the read command Instruction_A in the buffer 126 to the host 110. In another aspect, the control circuit 122 of the optical storage drive 320 controls the servo module 140 for executing a routine procedure (seeking operation) to make the optical storage drive 320 read the following data of the optical disc 150 and temporarily store the following data in the buffer 126 according to the main loop of the firmware program code 330.

However, the consuming time of the optical storage drive 320 transferring the data indicated by the read command Instruction_A to the host 110 is usually much shorter than that of the optical storage drive 320 executing a seeking operation. Thus, the host 110 has probably handled the data indicated by the read command Instruction_A and has sent another read command Instruction_C to the optical storage drive 320 for reading the following data before controlling the servo module 140 of the optical storage drive 320 for completing the seeking operation.

Therefore, in step 402, when the control circuit 122 of the optical storage drive 320 monitors the seeking operation of the servo module 140, the control circuit 122 receives the command Instruction_C sent from the host 110 and generates an interrupt request. And then, in step 404 after the interrupt request is generated, the control circuit 122 immediately interprets the command Instruction_C corresponding to the interrupt request.

In step 406, after the control circuit 122 interprets the command Instruction_C, the control circuit 122 determines whether the command Instruction_C is a read command or not. If the command Instruction_C sent from the host 110 is not a read command, the control circuit 122 first handles the preceding seeking operation and then responds to the command based on the priority of the command. The command Instruction_C is herein assumed to be a read command to illustrate the following steps.

In step 408, after the control circuit 122 judges that the command Instruction_C is a read command, the control circuit 122 checks whether the data indicated by the read command Instruction_C is stored in the buffer 126.

If the data indicated by the read command Instruction_C is not stored in the buffer 126, it means that the optical storage drive 320 has to read data from the optical disc 150. The servo module 140, however, is executing the seeking operation and cannot start another seeking operation. The read command Instruction_C has to wait until the seeking operation is completed or to stop the seeking operation immediately. After the preceding seeking operation is completed, the read command Instruction_C is checked to decide whether it needs to be executed. Because the purpose of the preceding seeking operation of the servo module 140 is to read the following data of the optical disc 150 to supply the data quantity of the buffer 126, if the data read by the routine procedure and the read command Instruction_C are the same, or the data to be read by the routine procedure contains the data to be read by the read command Instruction_C, the optical storage drive 320 does not need to execute the seeking operation again according to the read command Instruction_C.

In another aspect, if only a part of the data indicated by the read command Instruction_C is stored in the buffer 126, in an embodiment of the present invention, the control circuit 122 first transfers the part of the data in the buffer 126 back to the host 110 and the remaining data indicated by the read command Instruction_C waits until the servo module 140 completed the seeking operation. In another embodiment of the present invention, the control circuit 122 waits until the whole data indicated by the read command Instruction_C is ready and then transfers the data to the host 110.

Additionally, in step 408, if the data indicated by the read command Instruction_C is stored in the buffer 126, the control circuit 122 will proceed to step 410.

In step 410, the control circuit 122 transfers the data indicated by the read command Instruction_C in the buffer 126 to the host 110 at the same time as executing the seeking operation. It is equal to parallel handling of the seeking operation and responding to the read command Instruction_C. In the control circuit 122, the circuit for monitoring seeking operation of the servo module 140 and the circuit for transmitting data to the host 110 are different and have no conflicts. Thus, the two parallel operations do not cause adversely functional effect to the optical storage drive 320. Therefore, the operation of the host 110 is able to avoid from delaying by the data interruption.

After the control circuit 122 transferred all the data indicated by the read command Instruction_C to the host 110, the control circuit 122 proceeds to step 412 and clears the interrupt request corresponding to the read command Instruction_C.

In step 414, the flow of the firmware program code 330 that the control circuit 122 executes returns to the original preceding main loop. As mentioned above, since the execution time of the seeking operation is more than that required for transferring the data to the host 110, the servo module 140 might not have finished the seeking operation when the control circuit 122 has finished responding to the read command Instruction_C.

Similarly, if the servo module 140 has not finished the seeking operation but the host 110 has finished processing the data indicated by the read command Instruction_C and sent another read command Instruction_D to the optical storage drive 320, the control circuit 120 will repeat step 404 to step 412 to immediately respond to the read command Instruction_D.

As such, according to the present invention, the method for handling an interrupt request when the optical storage drive 320 executes a control procedure or operation that needs a longer time does not interrupt the original proceeding control procedure and operation and immediately responds to the read command sent from the host 110. Because the firmware program code 330 according to the present invention does not use the State Machine programming method, there is no need to divide the control procedure or operation that needs a long time into several states. This means the complexity of the firmware program code 330 is much lower than related art.

Additionally, when an interrupt request occurs, the control circuit 122 only needs to use a few operating cycles to interpret the command corresponding to the interrupt request. So, as soon as the command is determined not to be a read command and the command need not to response very soon, the control circuit 122 will temporarily not handle it so that the operation of the servo module 140 will not be influenced. If the command is a read command, the control circuit 122 only needs to easily check whether the data indicated by the command is in the buffer 126 or not. If the data indicated by the command is not stored in the buffer 126, the control circuit will temporarily not handle the command. If the data indicated by the command is stored in the buffer 126, the control circuit 122 will transfer the data to the host 110. Because the circuit that controls the servo module 140 in the control circuit 122 and the circuit responsible to transfer data to the host 110 in the control circuit 122 have no conflicts, the normal operation of the servo module 140 is not influenced.

Oppositely, the optical storage drive 120 of the related art utilizing the control circuit 122 to interpret and respond to the corresponding command after the servo module 140 completes the proceeding seeking operation might have data operation adversely affected by the host 110 because of the data interrupt.

The method according to the present invention not only increases the smoothness of transferring data of an optical disc (such as a VCD) between the optical storage drive 320 and the host 110, but also lowers the complexity and the cost of maintaining and updating the firmware program code 330 because there is no need to use a State Machine programming method.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for handling an interrupt request in an optical storage drive when the optical storage drive executes a control procedure or operation, the method comprising:
utilizing the optical storage drive to receive an interrupt request from a control circuit after execution of the control procedure or operation has begun;
checking whether the interrupt request corresponds to a read command;
when the interrupt request corresponds to a read command, checking whether data indicated by the read command is stored in a buffer; and
when the indicated data is stored in the buffer, transferring the corresponding data to the control circuit from the buffer to respond to the interrupt request in parallel with the execution of the control procedure or operation.

2. The method of claim 1, wherein the buffer is a volatile memory of the optical storage drive.

3. The method of claim 1, wherein the buffer is a register of the optical storage drive.

4. The method of claim 1, wherein the control circuit is a host computer.

5. The method of claim 1, further comprising:
if the data indicated by the read command is not stored in the buffer, suspending handling the interrupt request.

6. A storage medium for storing program code used to control an optical storage drive to perform the following steps while executing a control procedure or operation:
receiving an interrupt request from a control circuit;
checking whether the interrupt request corresponds to a read command;
when the interrupt, request corresponds to a read command, checking whether data indicated by the read command is stored in a buffer; and
when the indicated data is stored in the buffer, transferring the corresponding data to the control circuit from. the buffer to respond to the interrupt request in parallel with the execution of the control procedure or operation.

7. The storage medium of claim 6 being a non-volatile memory.

8. A method for handling an interrupt request in an optical storage drive when the optical storage drive executes a control procedure or operation, the method comprising:
providing a control circuit comprising a first control circuit and a second control circuit;
utilizing the optical storage drive to control the first control circuit to perform a seeking operation;
receiving an interrupt request;
checking whether the interrupt request corresponds to a read command;
when the interrupt request corresponds to a read command, checking whether data indicated by the read command is stored in a buffer; and
when the indicated data is Stored in the buffer, utilizing the second control circuit to transfer the corresponding data from the buffer to respond to the interrupt request in parallel with the first control circuit executing the control procedure or operation.

9. The method of claim 1, wherein the buffer is a volatile memory of the optical storage drive.

10. The method of claim 1, wherein the buffer is a register of the optical storage drive.

11. The method of claim 1, wherein the control circuit is a host computer.

12. The method of claim 1, further comprising:
if the data indicated by the read command is not stored in the buffer, suspending handling die interrupt request.

13. A storage medium for storing program code used to control an optical storage drive to perform the following steps while executing a control procedure or operation:
receiving an intermit request from a control circuit. The control circuit comprising a first control circuit and a second control circuit;
checking whether the interrupt request corresponds to a read command;
when the interrupt request corresponds to a read command, checking whether data indicated by the read command is stored in a buffer; and
when the indicated data is stored in the buffer, utilizing the second control circuit to transfer the corresponding data to the control circuit front the buffer to respond to the interrupt request;
wherein the control procedure or operation is executed by the first control circuit, and the second control circuit transforms the data in parallel with the execution of the control procedure or operation.

14. The storage medium of claim 6 being a non-volatile memory.

* * * * *